United States Patent
Batur

(10) Patent No.: US 7,982,775 B2
(45) Date of Patent: Jul. 19, 2011

(54) METHOD AND APPARATUS FOR MOTION STABILIZATION

(75) Inventor: Aziz Umit Batur, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 504 days.

(21) Appl. No.: 12/184,669

(22) Filed: Aug. 1, 2008

(65) Prior Publication Data

US 2009/0033750 A1 Feb. 5, 2009

Related U.S. Application Data

(60) Provisional application No. 60/953,550, filed on Aug. 2, 2007.

(51) Int. Cl.
*H04N 5/228* (2006.01)
*G06K 9/40* (2006.01)

(52) U.S. Cl. .................. 348/208.6; 382/255

(58) Field of Classification Search ............. 348/208.6, 348/208.13; 382/255
See application file for complete search history.

(56) References Cited

U.S. PATENT DOCUMENTS

| | | | |
|---|---|---|---|
| 6,122,004 A * | 9/2000 | Hwang | 348/208.13 |
| 7,244,919 B2 * | 7/2007 | Ishikawa et al. | 250/208.1 |
| 2004/0238718 A1 * | 12/2004 | Washisu | 250/201.2 |
| 2005/0057662 A1 * | 3/2005 | Washisu | 348/208.99 |
| 2006/0244836 A1 | 11/2006 | Batur | |
| 2007/0077055 A1 * | 4/2007 | Tominaga et al. | 396/256 |
| 2007/0242936 A1 * | 10/2007 | Chujo et al. | 396/55 |
| 2009/0002501 A1 * | 1/2009 | Silsby et al. | 348/208.16 |
| 2009/0219402 A1 * | 9/2009 | Schneider | 348/208.7 |

* cited by examiner

*Primary Examiner* — Tuan Ho
*Assistant Examiner* — Albert H Cutler
(74) *Attorney, Agent, or Firm* — Mirna Abyad; Wade J. Brady, III; Frederick J. Telecky, Jr.

(57) ABSTRACT

A method and apparatus for digital image stabilization. The method comprises segmenting an exposure time to have multiple partial-exposure images of a scene and manipulating the partially exposed images to produce a stable image.

16 Claims, 4 Drawing Sheets

WITHOUT IMAGE STABILIZATION

|←——————— NORMAL EXPOSURE TIME ———————→|

WITH IMAGE STABILIZATION

|← SHORT EXPOSURE TIME →|← SHORT EXPOSURE TIME →|← SHORT EXPOSURE TIME →|← SHORT EXPOSURE TIME →|

METHOD AND APPARATUS FOR MOTION STABILIZATION

CROSS-REFERENCE TO RELATED APPLICATIONS

This application claims priority from provisional application No. 60/953,550, filed Aug. 2, 2007. The following co-assigned, co-pending patent applications disclose related subject matter: application Ser. No. 11/379,835, filed Apr. 24, 2006, which claims priority to provisional patent application 60/676,088, filed Apr. 28, 2005.

BACKGROUND OF THE INVENTION

The present invention relates to digital signal processing, and more particularly to image stabilization methods and imaging devices with electronic stabilization.

Image stabilization (IS) is the task of eliminating jitter from video sequences captured by handheld cameras. Jitter is typically due to the undesired shake of the hand during video recording, and becomes a more severe problem when higher zoom ratios are used. Eliminating jitter from video sequences has been an increasingly important problem for consumer digital cameras and camera phones. There are a few different approaches to the solution of the image stabilization problem. One particular approach is to use digital image processing techniques to eliminate jitter. This approach is generally called "digital image stabilization" (DIS).

A typical digital image stabilization method can be summarized as follows:
Step 1: Motion vector computation: Compute a number of candidate motion vectors between two frames by finding the correlations between blocks of pixels.
Step 2: Global motion vector determination: Process the candidate motion vectors from step 1 using a number of heuristics to find the global jitter motion between the two frames.
Step 3: Motion compensation: Compensate for the estimated jitter motion by digitally shifting the output image in the reverse direction of the motion.

SUMMARY OF THE INVENTION

The present invention provides a method and apparatus for digital image stabilization. The method comprises segmenting an exposure time to have multiple partial-exposure images of a scene and manipulating the partially exposed images to produce a stable image.

BRIEF DESCRIPTION

Figure 1:
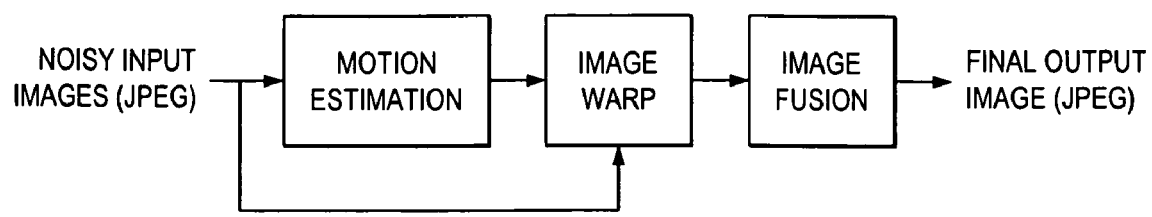
Figure 2:
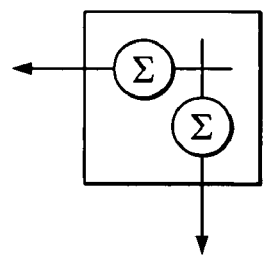
Figure 3:
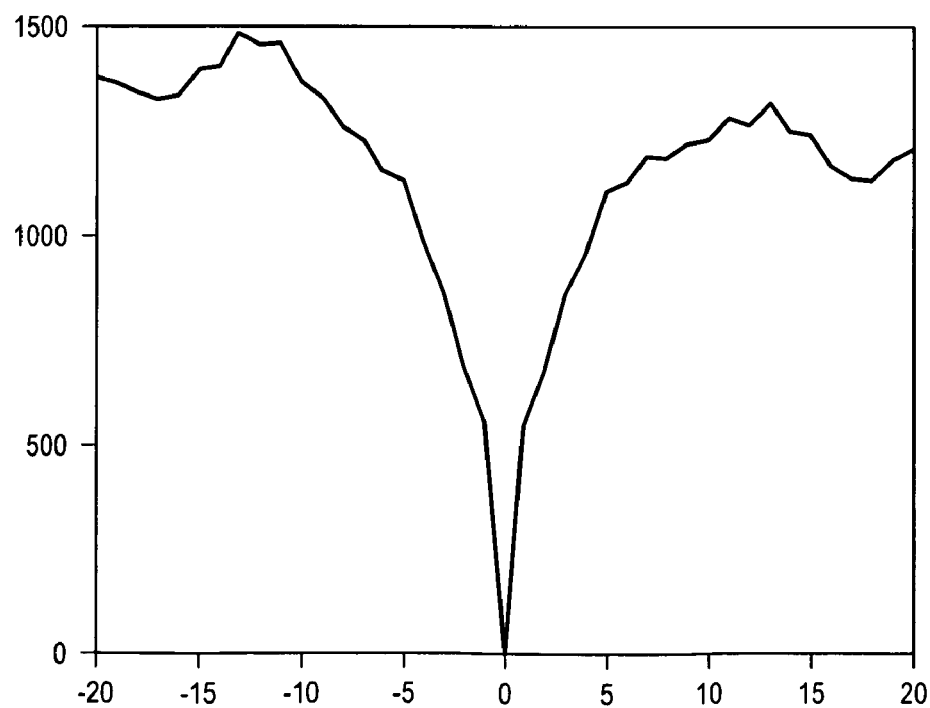
Figure 4:
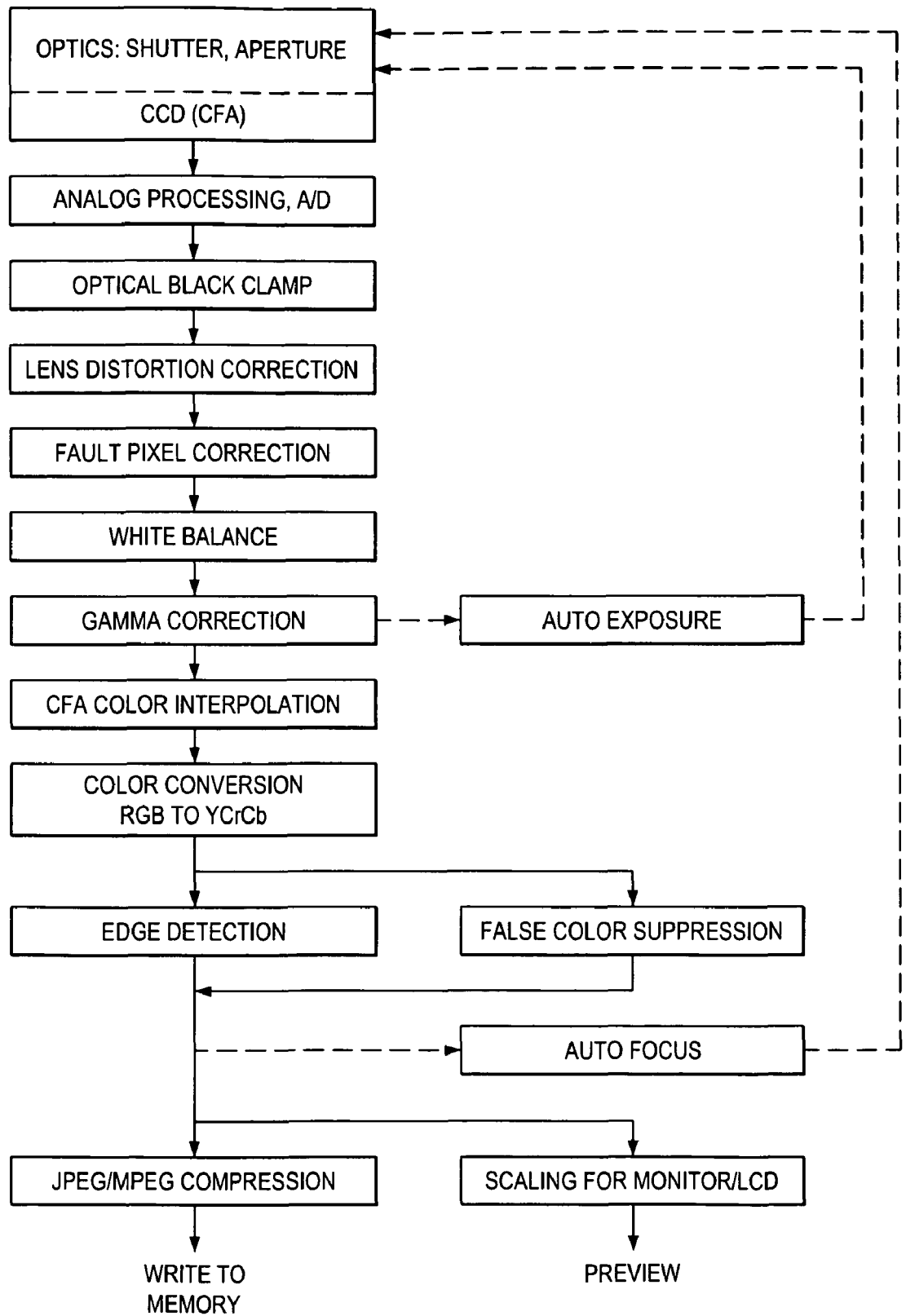
Figure 5:
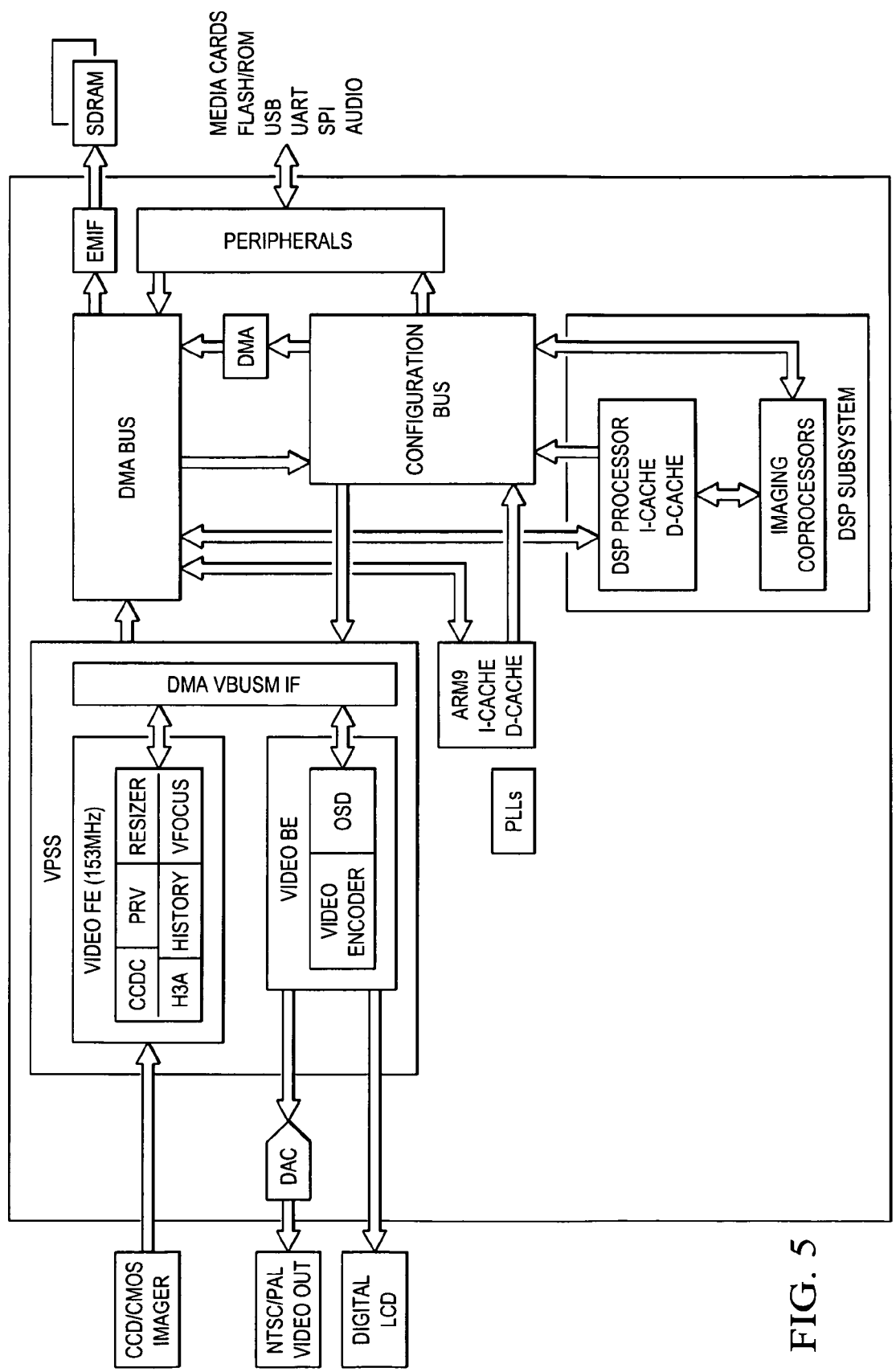
Figure 6:
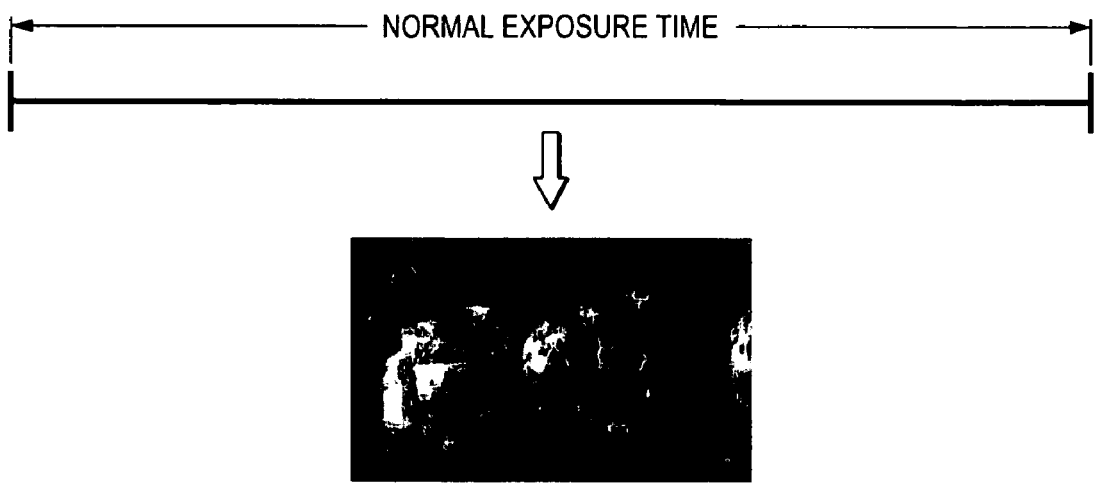
Figure 6:
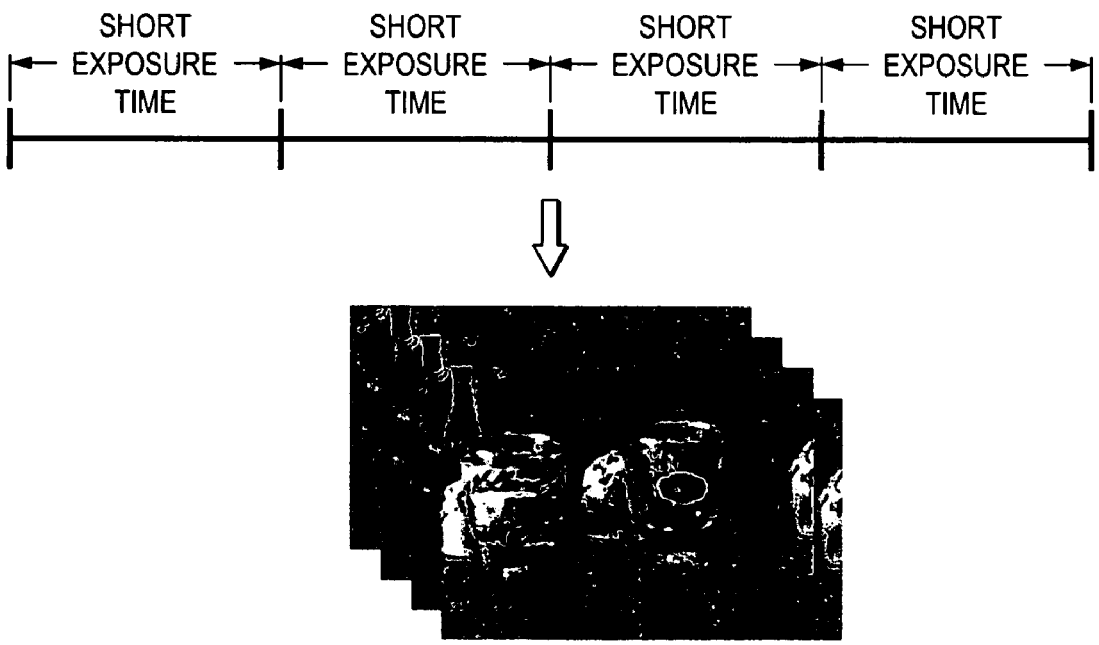

FIG. 1 is an embodiment method for motion estimation;
FIG. 2 is an exemplary embodiment of a block boundary summation;
FIG. 3 is an exemplary embodiment of a SAD shift response;
FIG. 4 is an exemplary embodiment of an image pipeline;
FIG. 5 is an exemplary embodiment of a processor utilized in motion estimation; and
FIG. 6 is an exemplary embodiment of a blurry image.

DESCRIPTION OF THE INVENTION

1. Overview

The first embodiment method of digital image stabilization (DIS), such as for hand-held video devices, by segment exposure time and fuse images taken during exposure segments after alignment where the alignment uses large changes in SAD of within-image row and column shifts. In effect, embodiments use the column and row sums to identify good features for image registration. This approach detects the feature points effectively and is also robust to repetitive patterns that are undesirable for motion estimation.

Another important advantage is that it uses two 1D operations, which significantly reduces its computational complexity. Prior art uses more complicated 2D operators to identify feature locations. Our solution also uses a hierarchical solution to create a fusion mask. This hierarchical method detects image structure in the difference image at different scales and identifies image alignment errors accurately. It also has low complexity due to simple filtering and thresholding operations. FIG. 1 illustrates high level functions.

In one embodiment, systems include camcorders, digital cameras, video cellphones, video display devices, et cetera. FIG. 4 shows a generic image processing pipeline and one embodiment for stabilization that could be performed in the MPEG/JPEG functions and integrate with motion vector determination. Indeed, unstabilized video could be displayed with this embodiment stabilization applied as part of the display process.

In one embodiment, systems may be implemented with any of several types of hardware: digital signal processors (DSPs), general purpose programmable processors, application specific circuits, or systems on a chip (SoC) such as combinations of a DSP and a RISC processor together with various specialized programmable accelerators. FIG. 5 illustrates an example of a processor for digital camera applications with a video processing subsystem in the upper left. A stored program in an onboard or external (flash EEP)ROM or FRAM could implement the signal processing. Analog-to-digital converters and digital-to-analog converters can provide coupling to the real world, modulators and demodulators (plus antennas for air interfaces) can provide coupling for transmission waveforms, and packetizers can provide formats for transmission over networks such as the Internet.

In another embodiment, methods apply to low light environments where a typical digital camera captures images using long exposure times that may result in a blurry image as shown on the top of FIG. 6. In this embodiment, methods shown on the bottom of FIG. 6 where we divide the exposure time into smaller segments and capture multiple short exposure images. These images are not blurred; however, they are noisy due to short exposure. Our goal is to align and fuse these images to create an image that is both sharp and noise-free.

There are three main blocks of our method as shown in FIG. 1. Since multiple images are required for this method, memory requirements would be very high if we had to buffer raw images. Memory size is an important limitation in camera phones and digital cameras; therefore, we have designed our method to work on JPEG encoded image files, which take less space. We decode blocks from input JPEG files, produce the final image block, and encode it into JPEG.

A step by step description of one embodiment image for stabilization method is as follows:
PART 1: Motion Estimation
Let N be the number of JPEG images stored in external memory. N should be at least 2. Having more images is better. N=4 is recommended. We select one of these N images as the base image. This selection can be made randomly, or the last image can be selected as the base image because it is likely to have the least amount of blur. (The camera may move more during the capture of the early images while the user is pressing the shutter button, which suggests that the last image may have the least amount of blur.) Base image will form the final image and all other images, which we call enhancement images, will be fused to the base image to reduce the noise level. We follow the following procedure to estimate motion between the base image and all other enhancement images:

(1) Decode one block from the base image. Block size changes depending on image size. Typically, we would like to have 16 blocks in the image arranged in a 4×4 grid. We will refer to these blocks as "main blocks". We use only the Y component of the image for steps 1 through 10 below. Cb and Cr components are used only in step (11).

(2) Divide the main block into smaller blocks, which we will refer to as "sub-blocks". Typically, we would like to have 16 sub-blocks arranged in a 4×4 grid inside a main block.

(3) For each sub-block, compute two boundary signals. Boundary signals are the row and column sums for each sub-block as shown in FIG. 2.

(4) Compute the sum-of-absolute-differences (SADs) of each boundary signal with itself for different shifts in the range −20 to +20. SAD at shift=0 should be equal to zero. Starting at shift 0, as we move towards negative or positive shifts, the SAD is expected to increase. An example is shown in FIG. 3.

(5) Starting at shift=0, proceed towards negative shifts and find the shift where the SAD value stops increasing. In other words, find Sl where SAD at Sl−1 is smaller than the SAD at Sl. (In the figure above, Sl is around −11). Then, find the smallest SAD, Tl, for shifts larger than Sl in the negative direction. In the figure above, Tl is around 1300 and is achieved around shift (−16). Repeat the same procedure for positive shift and identify Tr. In the figure above, Tr is around 1200 and is achieved around shift 17. Tr and Tl are indicators of the image content in this block. Small Tr and Tl values indicate mostly a flat block or a block with repetitive patterns. Both types of blocks would be unreliable for motion estimation and should be avoided. Blocks with large Tr and Tl values indicate good image features for motion estimation. Compute Tmin, the minimum of Tr and Tl for each sub-block. Rank all 16 sub-blocks in a main block in terms of Tmin values from the largest to the smallest. Pick the sub-blocks with largest Tmin values as features for motion estimation. We typically select the best 2 sub-blocks from each main block.

(6) For each sub-block in the main block, compute the mean pixel value. Then, compute the average absolute deviation from the mean pixel value by computing the absolute difference of each pixel from the mean and by computing the average of all absolute differences. Among all 16 sub-blocks, pick the lowest average absolute deviation as an estimate of the noise level in this main block. Then, among all main blocks, pick the smallest absolute deviation as an estimate of the noise level in the entire image.

(7) For each sub-block that was selected for motion estimation, decode the search area that corresponds to this sub-block from the enhancement images one by one. Create a hierarchical representation of the sub-block and the search area. Compute a motion vector for the sub-block using coarse-to-fine search with SADs.

(8) Fit a parametric affine model to all motion vectors using a least squares optimization procedure. This involves solving an equation in the form Ax=b where A and b include motion vector information and x includes the unknown affine parameters. After the affine parameters are determined, compute the error for each motion vector according to this affine model. Remove the motion vector that has the largest error and recompute the affine model. Repeat this iterative procedure until the largest error is less than some threshold. Typically, 2 is a good value for the threshold.

PART2 Image Warping and Fusion (9) Decode each main block from the base image. For each main block, decode the corresponding blocks from other images one by one. Warp these blocks according to the affine transform computed in step 8. After being warped, these blocks will be aligned with the base image block.

(10) Compute the difference between the base block and the warped block. Ideally, this difference should be entirely noise. However, due to moving objects, motion estimation errors, or lens distortion effects, there may be alignment errors. These alignment errors result in large values in the difference image. We will identify the location of alignment errors by thresholding the difference image. In order to achieve better accuracy, we will use a hierarchical thresholding method. Filter the difference image vertically and horizontally with the following 2-tap filter: [1 1]. The resulting image is the first level of the hierarchical representation. Filter this first level vertically and horizontally with the following filter to create the second level: [1 0 1]. Filter the second level with the following filter vertically and horizontally to create the third level: [1 0 0 0 1]. Threshold the absolute values of all three levels such that if the absolute value of a pixel is larger than the threshold, it is set to 1. Compute the OR function of the corresponding pixels from all three levels. This final binary image, which we call the mask, determines which pixels will be fused. Only the pixels that correspond to 0 in the mask will be used for fusion. The threshold values used above should be adjusted depending on the noise level in the image. We have computed the noise level in step 6. Compute the threshold values based on the estimated noise level as follows: T1=4*noiseLev, T2=2*noiseLev, T3=1*noiseLev, where noiseLev is from step 6, and T1, T2, and T3 are thresholds for levels 1, 2, and 3 respectively.

(11) Fuse images by averaging corresponding pixels. Average only pixels that are assigned to 0 in the mask computed in step 10. Repeat this procedure for Y, Cb, and Cr components of the image.

What is claimed is:

1. A method of digital image stabilization, comprising:
   segmenting an exposure time to have multiple partial-exposure images of a scene;
   manipulating the partially exposed images to produce a stable image, wherein the manipulating of the partially exposed images comprises:
   finding regions in the partially exposed images for alignment by maximizing sum-absolute-differences (SAD) of row and column shifts; and
   at least one of aligning or fusing the partially exposed images by accounting for the regions found for alignment,
   wherein the step of manipulating the partially exposed images comprises performing motion estimation, which comprises:
   choosing a base image from the partially exposed images;
   decoding at least one block from the base image;
   dividing the at least one block of the base image into sub-blocks;
   computing at least one boundary signal for at least one of the sub-blocks;
   computing the SAD of at least one of the boundary signals with the at least one of the boundary signals for at least one shift;
   finding a shift where the SAD stops at least one of increasing or decreasing;
   determining the motion estimation utilizing at least one sub-block with a Tmin,
   wherein the Tmin is determined utilizing the found shift;
   computing a mean pixel value for at least one sub-block;

computing an average absolute deviation from the mean pixel value;

utilizing the sub-block with the lowest average absolute deviation for estimating noise level in the at least one block;

utilizing the block with the lowest average absolute deviation for estimating noise level in the base image;

decoding a search area, which corresponds to the at least one sub-block of the base image, in the partially exposed images;

computing at least one motion vector for the at least one sub-block;

computing a parametric affine for the at least one motion vector;

decoding the at least one block from the base image and the corresponding at least one block in the rest of partially exposed images;

warping the decoded blocks of the base and partially exposed images according to the computed parametric affine transform;

aligning the at least one block from the partially exposed images to the corresponding at least one block of the base image to produce a warped block;

computing the difference between the base block and the warped block thresholding the computed difference to determine alignment errors and at least one fusing pixel for fusing; and fusing the partially exposed images by averaging the corresponding at least one fusing pixel.

2. The method of claim 1, wherein the produced stable image is noise free.

3. The method of claim 1, wherein the base image has the least amount of at least one of blur or noise.

4. The method of claim 1, wherein the boundary signals for the sub-blocks are two boundary signals, comprising the row and column sums.

5. The method of claim 1, wherein the shift ranges between −20 and +20.

6. The method of claim 1, wherein the shift ranges starts at zero.

7. The method of claim 1, wherein the Tmin is determined utilizing Tr and Tl values of the sub-blocks.

8. The method of claim 1, wherein the step of decoding the search area in the partially exposed images does not include the base image.

9. The method of claim 1, wherein a coarse-to-fine search SAD is utilized for calculating the at least one motion vector.

10. The method of claim 1, wherein squares optimization procedure is utilized for fitting the parametric affine model of at least one motion vector.

11. The method of claim 1, wherein the utilized thresholding the computed difference utilizes a hierarchical thresholding method.

12. The method of claim 11, wherein the averaging corresponding pixels are the average pixels that are assigned to zero in the hierarchical thresholding method.

13. The method of claim 1, wherein the method is repeated for Y, Cb and Cr components of the digital image.

14. The method of claim 1, wherein the Tmin is the largest Tmin.

15. The method of claim 1, wherein the average absolute deviation is computed by computing the average of the computed absolute differences of the pixel from the mean pixel value and computing the average absolute difference for the sub-blocks.

16. A non-transitory computer readable medium comprising instructions when executed perform an image stabilization method, comprising:

segmenting an exposure time to have multiple partial-exposure images of a scene;

choosing a base image from the partially exposed images;

decoding at least one block from the base image;

dividing the at least one block of the base image into sub-blocks;

computing at least one boundary signal for at least one of the sub-blocks;

computing the SAD of at least one of the boundary signals with the at least one of the boundary signals for at least one shift;

finding a shift where the SAD stops at least one of increasing or decreasing;

determining the motion estimation utilizing at least one sub-block with the largest Tmin, wherein the Tmin is determined utilizing the found shift;

computing a mean pixel value for at least one sub-block;

computing an average absolute deviation from the mean pixel value by computing the average of the computed absolute differences of the pixel from the mean pixel value and computing the average absolute difference for the sub-blocks;

utilizing the sub-block with the lowest average absolute deviation for estimating noise level in the at least one block;

utilizing the block with the lowest average absolute deviation for estimating noise level in the base image;

decoding a search area, which corresponds to the at least one sub-block of the base image, in the partially exposed images;

computing at least one motion vector for the sub-block;

computing a parametric affine for the at least one motion vector;

decoding the at least one block from the base image and the corresponding at least one block in the rest of partially exposed images;

warping the decoded blocks of the base and partially exposed images according to the computed parametric affine transform;

aligning the at least one block from the partially exposed images to the corresponding at least one block of the base image to produce a warped block;

computing the difference between the base block and the warped block thresholding the computed difference to determine alignment errors and at least one fusing pixel for fusing; and fusing the partially exposed images by averaging the corresponding at least one fusing pixel.

* * * * *